July 30, 1968

W. STELZER 3,394,546

HYDRAULIC BRAKE FLUID MOTOR

Filed Oct. 31, 1966

INVENTOR.
William Stelzer
BY
Harness, Dickey & Pierce
ATTORNEYS.

United States Patent Office 3,394,546
Patented July 30, 1968

3,394,546
HYDRAULIC BRAKE FLUID MOTOR
William Stelzer, Bloomfield Hills, Mich., assignor to Kelsey-Hayes Company, a corporation of Delaware
Filed Oct. 31, 1966, Ser. No. 590,650
9 Claims. (Cl. 60—54.5)

ABSTRACT OF THE DISCLOSURE

A device is provided for proportioning the fluid pressure applied to the cylinder of the front and rear brakes of a vehicle.

The device has particular application for hydraulically actuated brakes where brake drums are employed on one pair of wheels and brake disks are employed in the other set of wheels. Due to the use of return springs on the drum type brakes, the initially applied pressure will not operate the drum brakes until the spring pressure is overcome which may require 60 p.s.i. pressure. The device of the present invention is so constructed as to prevent the operation of the disk brakes on the front wheels having no such return spring until a braking pressure is applied to the rear wheels. The further novelty in the arrangement is that of proportioning the pressure applied to the front and rear brake cylinders after initial like pressure has been applied thereto, relatively increasing the pressure on the front brake cylinders over that applied to the rear brake cylinders.

Accordingly, the main objects of the invention are: to provide a device which proportions the pressure applied to the front and rear brake cylinders as the applied braking force increases; to shut off the supply of fluid to the disk brakes until a sufficient pressure has been built up to overcome the spring pressure of the drum brakes; to apply like pressure to the front and rear brake cylinders after the pressure has been built up to a predetermined amount and thereafter utilize all or part of the built up pressure for the braking operation; to porvide a backup sleeve for an elastomeric seal which is moved therewith and with a piston as pressure builds up on the fluid to boost the pressure of the fluid in the cylinders of one set of brakes, and in general, to provide a device for boosting the hydraulic pressure on the front brake cylinders over that on the rear brake cylinders which is simple in construction, positive in operation and economical of manufacture.

Figure 1:
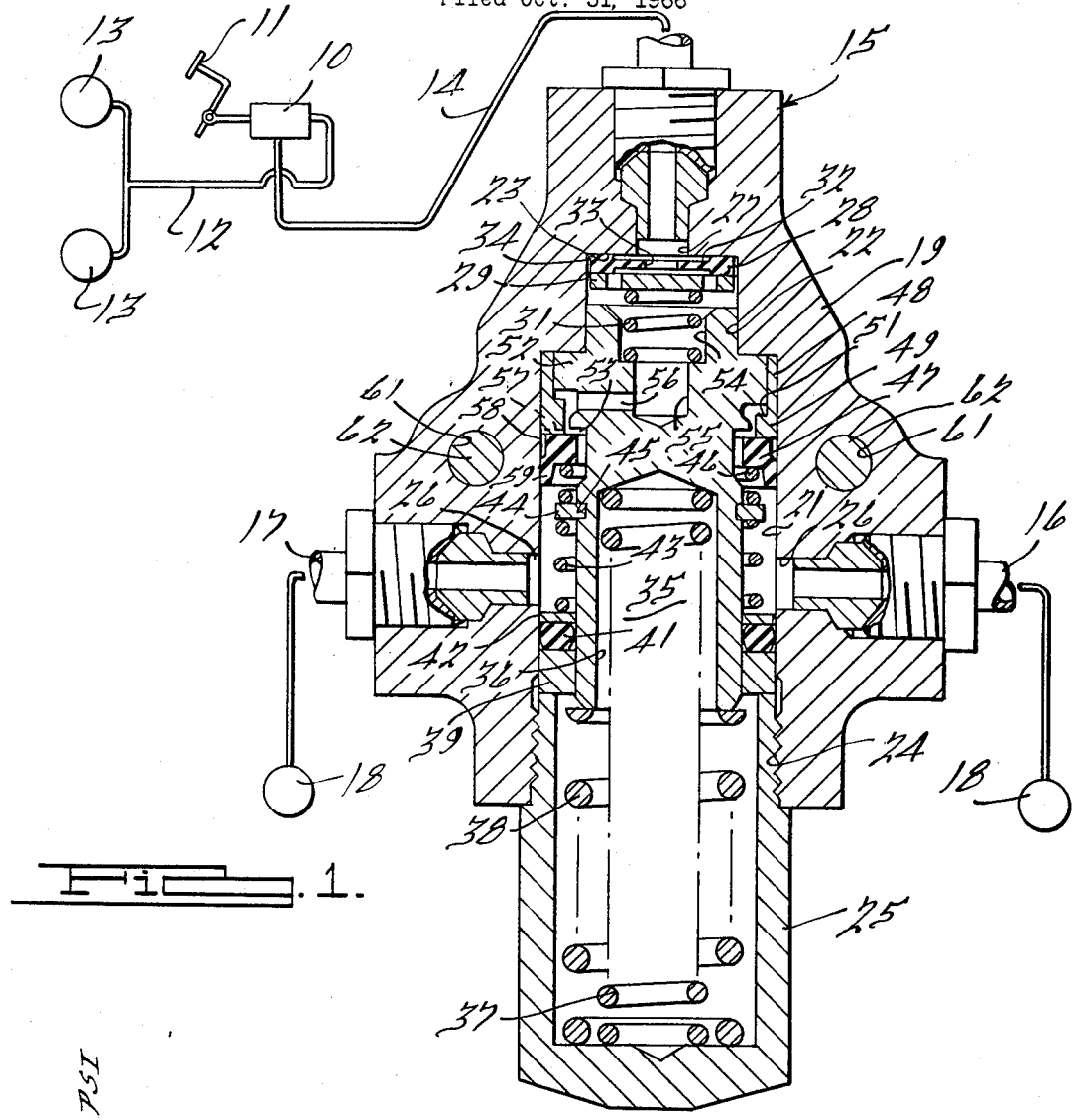
Figure 2:
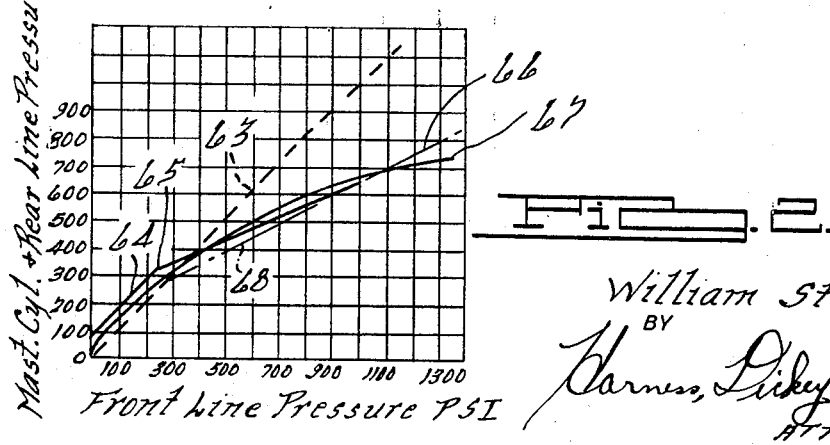

Other objects and features of novelty of the invention will be specifically pointed out or will become apparent when referring, for a better understanding of the invention, to the following description taken in conjunction with the accompanying drawing, wherein:

FIGURE 1 is a sectional view of a device connected in the fluid system for automotive brakes embodying features of the present invention, and FIG. 2 is a graph of a curve showing the increase in hydraulic pressure on the front brakes over that on the rear brakes as the applied pressure increases.

A master cylinder 10 is operated by a foot pedal 11 for delivering fluid through a conduit 12 directly to the brake cylinders of rear wheels 13 to apply a braking force to the brake drums employed thereat. A conduit 14 directs fluid to a booster device 15 having outlet passageways 16 and 17 to the cylinders of the disk brakes employed on the front wheels 18 for the arrangement herein described, it being understood that the brakes could be reversed on the wheels. The device 15 embodies a housing 19 having a cylindrical bore 21, the upper portion 22 being of reduced diameter providing a shoulder 23. The bottom end of the bore 21 has a thread 24 on which a threaded end of a cap 25 is screwed. The bore 21 has a pair of passageways 26 which admit fluid to conduits 16 and 17 and to the cylinders of the disk brakes of the front wheels 18. The housing 19 has an inlet passageway 27 for the fluid from the conduit 14 and master cylinder 10. A pressure delay valve is provided within the bore portion 22 embodying a rubber diaphragm 28 and a metal washer 29 which are urged against the shoulder 23 by a spring 31. The diaphragm 28 has a central thin section 32 containing a central aperture 33. The peripheral edge of the diaphragm 28 has a plurality of slots 34 forming fluid passageways with the wall of the bore 22.

The spring 31 is supported within an aperture 54 in the top of a piston 35 which also has an aperture 36 extending upwardly from its bottom and containing a spring 37 which engages the bottom of the cap 25. A spring 38, disposed outwardly of spring 37, engages the bottom of the piston 35 and also the bottom of the cap 25. The two springs provide the desired force while reducing the length of the cap. The cap contacts a washer 39 against which an O-ring 41 and washer 42 are urged by a spring 43. The upper end of the spring 43 engages a split washer 44 which is secured in an annular slot 45 in the peripheral wall of the piston 35. A spring 46 is disposed above the washer 44 in engagement with an elastomeric seal 47. The seal is engaged by a sleeve 48, preferably made of sintered metal, the bottom portion 49 having a wall of greater width for engaging a substantial portion of the seal 47 and forming a shoulder 51. The upper portion 52 of the piston 35 is of greater diameter to provide a shoulder 53 which is engageable with the seal 47 inwardly of the portion 49 of the sleeve 48. The sleeve 48 and shoulder 53 apply a force for moving the elastomeric seal 47 downwardly in the bore 21 when the piston 35 is moved downwardly therein.

A passageway 56 connects the aperture 54 to the outside surface of the piston 35. The seal 47 has a plurality of apertures 57 on the upper face which communicate with apertures 58 on the upper outer peripheral portion of the seal. When the fluid pressure above the seal 47 is greater than that below the seal, fluid may pass therebelow when deflecting a bottom sealing lip 59 inwardly of the bore wall. Apertures 61 are provided through the housing 15 having bolts 62 therethrough by which the device is supported.

In operation, having in mind the provision of brake drums on the rear wheels and the assumption that 60 pounds pressure is required to overcome the force of the return springs of the drum brakes and the desirability of delaying the application of fluid pressure to the disk brakes on the front wheels until the rear brakes are operated the pressure delaying valve embodying the elements 28 and 29 and the force of the spring 31 prevents any braking action occurring to the front wheels until the 60 pounds predetermined pressure had been built up in the master cylinder 10 and the cylinders of the rear wheels. Before this amount of pressure has built up on the fluid in the conduit 14, the diaphragm 28 will remain sealed at the edges and the central portion will move against the washer 29 to seal the aperture 33. The pressure of the spring 31 will retain the element 28 sealed within the bore portion 22 until sufficient pressure has been applied to overcome the tension of the spring 31. This pressure will be the 60 pounds pressure that is required to overcome the springs of the brake drums of the front wheels 18. It is to be understood that 60 p.s.i. herein referred to is by way of example.

Upon the application of further pressure on the fluid in the conduits 12 and 14 from the master cylinder 10, the rear brakes will begin to operate and the diaphragm 28 and washer 29 will move downwardly to permit the fluid to pass through the peripheral slot 34. Pressure will then be applied to the fluid in the apertures 54, 55 and 56 in the upper part of the piston 35 and to that in the conduits 16 and 17 and the cylinders of the front wheels 18. As the pressure builds up below the washer 29 and diaphragm 28 they will move against and from the shoulder 23. Referring to the curve of the graph of FIG. 2, the dotted line 63 shows the normal application of like fluid pressure ordinarily applied to the front and rear brake cylinders in a conventional construction. The section of the curve 64 illustrates the application of pressure to the front and rear brake cylinders after the 60 p.s.i. pressure has been reached. Thereafter the pressure applied to the front brake will be 60 p.s.i. less than rear brake pressure until a point 65 is reached. At this point, the pressure on the upper end of the piston 35 overcomes the force of the springs 37 and 38 and the piston 35 moves downwardly to cut off the fluid passageway about the piston. This occurs where the upper end portion 52 of the piston engages the shoulder 51 of the sleeve 48 and the piston shoulder portion 53 engages the seal 47. A further increase in fluid pressure applied to the top of the piston 35 will move the piston and the seal 47 downwardly to thereby apply increased pressure on the fluid in the conduits 16 and 17, and the brake cylinders of the front wheels 18. The pressure will be increased in a direct proportion of the area of the upper end of the piston 35 within the bore portion 21, to the area of the lower end of the piston subtracted from the area of the bore 21.

To clearly understand this effect, it can be assumed that the area of the bore 21 is .601 square inch and that the area of the piston 35 in the portion having the aperture 36 is .307 square inch, so that the difference between these two areas is .294 square inch. It is assumed that the total force exerted by the springs 37 and 38 is 90 pounds, and that the force of the spring 31 is 9 pounds and will compress when 60 p.s.i. is applied thereto. It is assumed that the shoulder 53 will engage seal 47 to close off the passage of fluid when the master cylinder pressure is 324 p.s.i. This is obtained by dividing the 90 less 9 pounds by the .307 square inch, which equals 264 p.s.i. plus the 60 pound pressure to compress the 9 pound spring 31 which equals the 324 p.s.i. required to overcome the spring pressures to permit the piston to move downwardly. The pressure being applied from the passageway 16 and 17 can be ascertained when the master cylinder pressure is known. If, for example, the master cylinder pressure is 800 pounds, then the line pressure would be $$(800 \times .601) - 90/.294$$

which equals 1325 p.s.i. As the piston 35 moves downwardly, the force of the spring 31 resting thereon decreases and this is shown on the curve by the position of the dot and dash line 68 representing the pressures that would exist if spring 31 were not included. Line 66 is shown approaching the line 68 as the piston 35 continues to move downwardly. The decreasing applied force of the spring 31, due to its elongation, reduces the spring force on the elements 28 and 29 and makes available all or part of the 60 p.s.i. pressure initially required to overcome the force of the spring 31 to increase the force on the fluid in the cylinders of the brakes on the front wheels 18. It will be noted from the curve that the lines 64 and 66 follow fairly closely a curved line 67 which was plotted for an ideal condition of pressures applied to the front and rear wheel cylinders when neglecting the effect of the return springs of the drum brakes.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a vehicle hydraulic brake system having a master cylinder and a plurality of brake cylinders, a pressure regulating device adapted to be interposed between the master cylinder and at least one brake cylinder, said device including a housing having an inlet, an outlet and bore providing communication between said inlet and outlet, a pressure proportioning piston positioned in said bore and movable toward said outlet to generate a pressure at said outlet which is different from the pressure acting on said piston, a pressure retarding valve positioned on the inlet side of said pressure proportioning valve, a spring normally holding said pressure retarding valve closed to prevent the flow of fluid from said inlet to said piston until the pressure of fluid at said inlet has reached a predetermined level, said spring being seated on said piston whereby the force which said spring delivers to said pressure retarding valve will be reduced as said piston moves toward said outlet.

2. The structure set forth in claim 1 including a second spring normally biasing said piston against movement toward said outlet, said second spring being designed to yield to permit movement of said piston toward said outlet at a second predetermined pressure greater than said first mentioned predetermined pressure.

3. The structure set forth in claim 1 in which said pressure retarding valve is unidirectionally acting to permit the flow of fluid from said outlet to said inlet irrespective of the closed condition of said pressure retarding valve.

4. The structure set forth in claim 1 in which said pressure proportioning piston has a lesser effective area exposed to fluid at said outlet than the effective area thereof exposed to fluid received from said inlet whereby said piston will generate a higher pressure at said outlet than the pressure of fluid received from said inlet by which it is motivated.

5. The structure set forth in claim 1 in which said pressure retarding valve is subject to the pressure of brake fluid on the opposite side thereof from said inlet as well as on its inlet side whereby said pressure retarding valve will tend to maintain a difference in pressures on the opposite sides thereof proportional to the force delivered to said valve by said spring.

6. The structure set forth in claim 1 in which said pressure proportioning valve includes a plurality of parts which are normally spaced apart to provide a passage for the direct transmission of fluid pressure from the inlet side of said piston to said outlet until the pressure of fluid on the inlet side of said piston reaches a predetermined value greater than said predetermined level.

7. In a device for delaying the passage of fluid from a master cylinder to the cylinders of front wheel disk brakes of a vehicle when the fluid is supplied directly from the master cylinder to the drum brakes of the rear wheel, a valve within said device, spring means for retaining said valve in open position until sufficient pressure has been built up in the device to overcome the force of said spring means, and a second valve within said device operable to close off the flow of fluid to said first valve until the pressure of the master cylinder fluid is sufficient to operate the rear brakes whereupon said second valve will open.

8. In a device as recited in claim 7, wherein a spring is disposed between said first and second valve for urging the latter toward closed position with a predetermined force which is overcome by the increase in fluid pressure which initially operated the drum brakes.

9. In a device as recited in claim 8, wherein the movement of the first said valve by increased pressure elongates said spring and progressively reduces the applied force thereof as the pressure to the front brake cylinders is relatively increased over that applied to the rear brake cylinders.

References Cited
UNITED STATES PATENTS 3,278,241   10/1966   Stelzer _____ 303—6
3,339,579   9/1967    Lewis et al. _____ 303—6 XR MARTIN P. SCHWADRON, *Primary Examiner.*

R. R. BUNEVICH, *Assistant Examiner.*